United States Patent
Cooper et al.

(10) Patent No.: US 10,454,267 B1
(45) Date of Patent: Oct. 22, 2019

(54) MOTOR PROTECTION DEVICE AND METHOD FOR PROTECTING A MOTOR

(71) Applicant: Franklin Electric co., Inc., Fort Wayne, IN (US)

(72) Inventors: Nicholas A. Cooper, Fort Wayne, IN (US); Adrian Chavis, Fort Wayne, IN (US); Thomas S. Wolf, Fort Wayne, IN (US); Zachary K. Foster, Spencerville, IN (US); Yaritza Brinker, Avilla, IN (US); Dalton Paull, Portland, OR (US)

(73) Assignee: Franklin Electric Co., Inc., Ft. Wayne, IN (US)

( * ) Notice: Subject to any disclaimer, the term of this patent is extended or adjusted under 35 U.S.C. 154(b) by 0 days.

(21) Appl. No.: 15/996,426

(22) Filed: Jun. 1, 2018

(51) Int. Cl.
| | |
|---|---|
| H02P 1/46 | (2006.01) |
| H02P 1/52 | (2006.01) |
| H02H 7/08 | (2006.01) |
| H02K 5/22 | (2006.01) |
| H02K 11/28 | (2016.01) |
| H04B 3/54 | (2006.01) |
| H02K 11/33 | (2016.01) |

(Continued)

(52) U.S. Cl.
CPC ........ *H02H 7/0833* (2013.01); *H02H 1/0007* (2013.01); *H02K 5/225* (2013.01); *H02K 11/0094* (2013.01); *H02K 11/28* (2016.01); *H02K 11/33* (2016.01); *H04B 3/54* (2013.01)

(58) Field of Classification Search
USPC ................. 318/599, 807, 808, 810, 811, 812
See application file for complete search history.

(56) References Cited

U.S. PATENT DOCUMENTS

| | | |
|---|---|---|
| 3,187,301 A | 1/1965 | Summers |
| 3,284,669 A | 11/1966 | Boyd |

(Continued)

FOREIGN PATENT DOCUMENTS

| | | |
|---|---|---|
| AU | 2005259068 B2 | 5/2009 |
| CN | 101755106 B | 4/2013 |

(Continued)

OTHER PUBLICATIONS

Zhang, Dong and Zhang; Status monitoring of electric submersible pump and down hole sensors, vol. 13, No. 1, dated Jan. 2009, 1 page.

(Continued)

*Primary Examiner* — Bentsu Ro
(74) *Attorney, Agent, or Firm* — Faegre Baker Daniels LLP

(57) ABSTRACT

A load protection system and a method of protecting a load. The load protection system includes a PLC transmitter and a PLC receiver, which are configured to communicate a plurality of bits of data, each bit transmitted near a zero-crossing of a voltage on the power lines supplying power to the load, in the form of a high frequency burst of pulses. The pulses are structured in two patterns. The first pattern serves to identify the start of the second pattern, and the second pattern includes the data. The first pattern is unique and not represented within the second pattern. The load may be a motor, and the data may include a parameter value representing a parameter of the motor. A motor controller may evaluate the parameter value to determine whether to institute a warning or alert action, to shut the motor down, or to continue operating.

21 Claims, 13 Drawing Sheets

(51) Int. Cl.
*H02H 1/00* (2006.01)
*H02K 11/00* (2016.01)

(56) References Cited

U.S. PATENT DOCUMENTS

| | | | |
|---|---|---|---|
| 3,326,008 A | 6/1967 | Paul | |
| 3,340,500 A | 9/1967 | Boyd | |
| 4,103,316 A * | 7/1978 | Kaneko | H02H 9/002 361/3 |
| 4,157,535 A | 6/1979 | Balkanli | |
| 4,178,579 A | 12/1979 | Mcgibbeny et al. | |
| 4,187,546 A | 2/1980 | Heffeman et al. | |
| 4,286,303 A | 8/1981 | Genheimer et al. | |
| 4,365,506 A | 12/1982 | Hyde | |
| 4,523,194 A | 6/1985 | Hyde | |
| 4,581,613 A | 4/1986 | Ward et al. | |
| 4,595,343 A | 6/1986 | Thompson et al. | |
| 4,631,536 A | 12/1986 | Ward et al. | |
| 4,876,539 A | 10/1989 | Farque | |
| 4,982,175 A | 1/1991 | Streater | |
| 5,515,038 A | 5/1996 | Smith | |
| 5,521,592 A | 5/1996 | Veneruso | |
| 5,539,375 A | 7/1996 | Atherton | |
| 5,577,890 A | 11/1996 | Nielsen et al. | |
| 5,670,931 A | 9/1997 | Besser et al. | |
| 5,973,465 A * | 10/1999 | Rayner | F04B 47/06 318/459 |
| 6,092,598 A | 7/2000 | Breit | |
| 6,114,947 A | 9/2000 | Tondorf | |
| 6,141,634 A | 10/2000 | Flint et al. | |
| 6,155,347 A | 12/2000 | Mills | |
| 6,182,764 B1 | 2/2001 | Vaynshteyn | |
| 6,188,552 B1 | 2/2001 | Jaeschke et al. | |
| 6,264,431 B1 | 7/2001 | Triezenberg | |
| 6,328,111 B1 | 12/2001 | Bearden et al. | |
| 6,329,905 B1 | 12/2001 | Cunningham | |
| 6,382,315 B1 | 5/2002 | Langseth | |
| 6,386,108 B1 | 5/2002 | Brooks et al. | |
| 6,467,557 B1 | 10/2002 | Krueger et al. | |
| 6,536,529 B1 | 3/2003 | Kerr et al. | |
| 6,587,037 B1 | 7/2003 | Besser et al. | |
| 6,625,519 B2 | 9/2003 | Goodwin et al. | |
| 6,994,172 B2 | 2/2006 | Ray | |
| 7,123,160 B2 | 10/2006 | Hall et al. | |
| 7,248,178 B2 | 7/2007 | Layton | |
| 7,268,670 B2 | 9/2007 | Robertson | |
| 7,445,042 B2 | 11/2008 | Freer et al. | |
| 7,686,074 B2 | 3/2010 | Mccoy et al. | |
| 7,715,425 B2 | 5/2010 | Yonge et al. | |
| 7,729,372 B2 | 6/2010 | Yonge et al. | |
| 7,828,058 B2 | 11/2010 | Fielder | |
| 7,874,366 B2 | 1/2011 | Allcorn et al. | |
| 7,874,808 B2 * | 1/2011 | Stiles | F04B 49/20 417/18 |
| 7,982,633 B2 | 7/2011 | Booker et al. | |
| 8,051,912 B2 | 11/2011 | Layton | |
| 8,092,190 B2 * | 1/2012 | Leuthen | F04D 15/0066 15/66 |
| 8,106,615 B2 | 1/2012 | Tsuruta et al. | |
| 8,136,591 B2 | 2/2012 | Del et al. | |
| 8,138,622 B2 | 3/2012 | Layton et al. | |
| 8,287,246 B2 * | 10/2012 | Plitt | F04B 49/02 318/10 |
| 8,302,687 B2 | 11/2012 | Chen et al. | |
| 8,334,666 B2 | 12/2012 | Plitt et al. | |
| 8,342,238 B2 | 1/2013 | Mccoy et al. | |
| 8,347,953 B1 | 1/2013 | Elizondo et al. | |
| 8,400,093 B2 | 3/2013 | Knox et al. | |
| 8,446,292 B2 | 5/2013 | Layton | |
| 8,480,376 B2 | 7/2013 | Knox et al. | |
| 8,511,388 B2 | 8/2013 | Milne | |
| 8,534,366 B2 | 9/2013 | Fielder et al. | |
| 8,544,534 B2 | 10/2013 | Partouche et al. | |
| 8,584,761 B2 | 11/2013 | Fielder et al. | |
| 8,593,266 B2 * | 11/2013 | Robertson | E21B 47/0007 340/13.23 |
| 8,615,374 B1 | 12/2013 | Discenzo | |
| 8,708,041 B2 | 4/2014 | Villegas et al. | |
| 8,727,737 B2 | 5/2014 | Seitter | |
| 8,739,861 B2 | 6/2014 | Hughes et al. | |
| 8,770,271 B2 | 7/2014 | Fielder et al. | |
| 8,833,441 B2 | 9/2014 | Fielder et al. | |
| 8,833,472 B2 | 9/2014 | Hay | |
| 8,866,425 B2 | 10/2014 | Lund et al. | |
| 8,910,710 B2 | 12/2014 | Krauss | |
| 9,206,684 B2 | 12/2015 | Parra et al. | |
| 9,621,223 B2 | 4/2017 | Thursby et al. | |
| 9,712,098 B2 | 7/2017 | Kidd et al. | |
| 9,765,612 B2 | 9/2017 | Donderici et al. | |
| 2002/0066568 A1 | 6/2002 | Buchanan et al. | |
| 2005/0240313 A1 | 10/2005 | Cartwright | |
| 2007/0252717 A1 | 11/2007 | Fielder | |
| 2008/0223585 A1 | 9/2008 | Patel et al. | |
| 2009/0045925 A1 | 2/2009 | Demin et al. | |
| 2009/0052281 A1 | 2/2009 | Nybo et al. | |
| 2009/0101340 A1 | 4/2009 | Jeffryes | |
| 2010/0071910 A1 | 3/2010 | Ellson et al. | |
| 2012/0037354 A1 | 2/2012 | Mccoy et al. | |
| 2012/0100014 A1 * | 4/2012 | Seitter | E21B 43/128 417/53 |
| 2012/0103627 A1 | 5/2012 | Larssen et al. | |
| 2012/0230852 A1 | 9/2012 | Andresen | |
| 2013/0009459 A1 | 1/2013 | Scheibelmass | |
| 2013/0098632 A1 | 4/2013 | Wetzel et al. | |
| 2013/0206387 A1 | 8/2013 | Deville et al. | |
| 2013/0248172 A1 | 9/2013 | Angeles et al. | |
| 2013/0248203 A1 | 9/2013 | Scott et al. | |
| 2013/0294931 A1 | 11/2013 | Magnusson et al. | |
| 2014/0077966 A1 | 3/2014 | Robertson et al. | |
| 2015/0007987 A1 | 1/2015 | Ayres | |
| 2015/0109138 A1 | 4/2015 | Shanks | |
| 2017/0019230 A1 | 1/2017 | Rajkotia et al. | |

FOREIGN PATENT DOCUMENTS

| | | |
|---|---|---|
| DE | 19817575 A1 | 10/1999 |
| EP | 0916101 A2 | 5/1999 |
| EP | 2309133 B1 | 7/2015 |
| FR | 2367272 A1 | 5/1978 |
| FR | 2708310 A1 | 2/1995 |
| FR | 2840725 A1 | 12/2003 |
| GB | 1589546 A | 5/1981 |
| GB | 2310986 A | 9/1997 |
| GB | 2368861 A | 9/1997 |
| GB | 2369759 B | 5/2002 |
| GB | 2378106 B | 9/2003 |
| GB | 2515249 A | 12/2014 |
| MX | 2011012294 A | 2/2012 |
| WO | WO 9305272 A1 | 3/1993 |
| WO | WO 9529553 A1 | 11/1995 |
| WO | WO 0251025 A1 | 6/2002 |
| WO | WO 2004028064 A2 | 4/2004 |
| WO | WO 2004038950 A2 | 5/2004 |
| WO | WO 2006003359 A1 | 1/2006 |
| WO | WO 2006102456 A1 | 9/2006 |
| WO | WO 2014120847 A1 | 8/2014 |
| WO | WO 2015065930 A1 | 5/2015 |

OTHER PUBLICATIONS

Meybodi; Wireless Plug and Play Control Systems: Hardware, Networks, and Protocols, downloaded from vbn.aau.dk on Jul. 27, 2015, 182 pages.

Bai, Du and Shi, Research on Signal Transmission Mode of Underground Based on Power Carrier; Applied Mechanics and Materials (/AMM) (vols. 190-191) and Digital Manufacturing & Automation III (/AMM 190-191), Jul. 26, 2015, 3 pages.

Konaté, Kosonin, Ahola, Machmoum, and Diouris; Power Line Communication in Motor Cables of Inverter-Fed Electric Drives, vol. 25, No. 1, Jan. 2010, 7 pages.

(56) References Cited

OTHER PUBLICATIONS

Ghoreishi, Liang, and Xu; Phase-to-Phase Communication Scheme for Downhole Monitoring Tool Design in Electrical Submersible Pump Systems, vol. 25, No. 3, May/Jun. 2016, 11 pages.

Grundfos, Submersible Systems Strength, Performance and Efficiency, availible at https://usermanual.wiki/Pump/5588731Grundfos4SpShobaProductBrochure.1280763818/help from May 10, 2018, 7 pages.

Skibinski; Line and load friendly drive solutions for long length cable applications in electrical submersible pump applications, Petroleum and Chemical Industry Technical Conference, 2004, Fifty-First Annual Conference 2004, 1 page.

Witrant, D'Innocenzo, Sandou, Santucci, Di Benedetto, Isaksson, Johansson, Niculescu, Olaru, and Serra; Wireless Ventilation Control for Large-Scale Systems: the Mining Industrial Case, https://hal.archives-ouvertes.fr/hal-00448406, Jan. 18, 2010, 34 pages.

Witrant, D'Innocenzo, Isaksson, Di Benedetto, Johansson, Santucci, and Strand; Mining ventilation control: a new industrial case for wireless automation, Submitted to The $4^{th}$ Annual IEEE Conference on Automation Science and Engineering, received Mar. 3, 2008, 7 pages.

Graves, Haque and Cox; CBT-C, CB3T, and CB3Q Signal-Switch Families, Texas Instruments, SCDA008—Jul. 2003, 34 pages.

\* cited by examiner

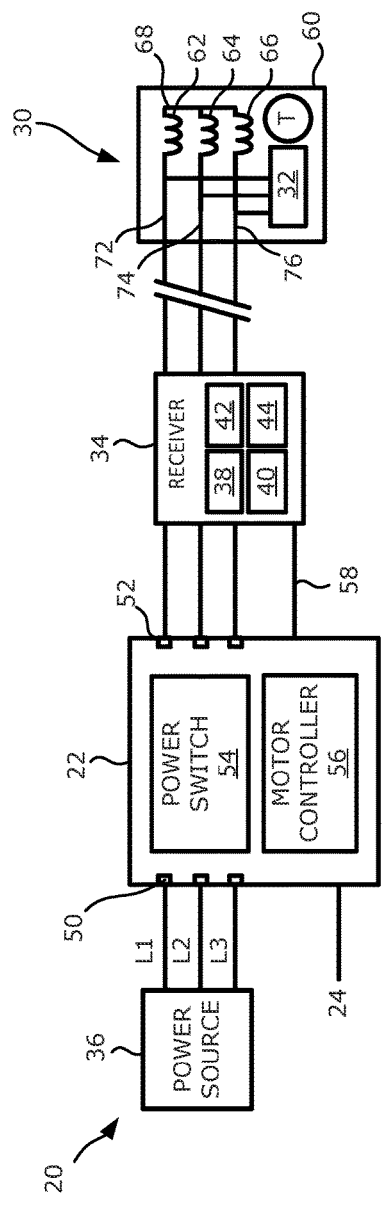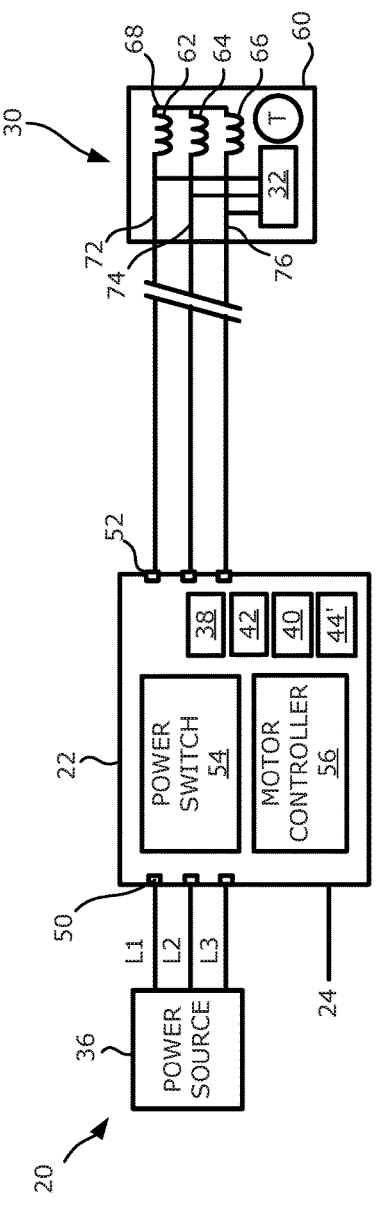

MOTOR PROTECTION DEVICE AND METHOD FOR PROTECTING A MOTOR

CROSS-REFERENCE TO RELATED APPLICATIONS

None.

TECHNICAL FIELD

The present disclosure relates to power line communications, and more particularly to power line communication transmitters, receivers, and protocols.

BACKGROUND OF THE DISCLOSURE

All motors generate heat. In the case of a submersible motor, heat is dissipated to the cooling flow of water drawn past the motor by the pump driven by the motor. If the cooling flow is interrupted, the motor can overheat and fail.

It is known to connect a power line communications (PLC) transmitter to the wye or neutral point of the motor to transmit a modulated signal through the motor and the power lines and to couple a receiver to the power lines to demodulate the modulated signal and extract relevant information. These neutral point systems require significant processing capacity to modulate the information over the power lines. Furthermore, connection to the neutral point limits where the transmitter can be placed to minimize cost or, alternatively, increases manufacturing complexity and cost if the transmitter is placed remotely from the neutral point. The high costs associated with modulation through the wye or neutral point may be justified where the power lines exhibit a high amount of noise due to, for example, use of a variable speed drive to provide a variable frequency voltage to the motor. The variable frequency voltage is typically generated by switching a DC voltage, with a power module comprising power switches, at frequencies between 2 KHz and 10 KHz. The switching frequencies generate noise, therefore complex systems are needed to communicate information from the motor to the surface.

Some applications do not justify the high cost of modulation through a neutral point system to overcome noise. Therefore, a need exists for a relatively low cost power line communication system.

SUMMARY OF CLAIMED EMBODIMENTS

The present disclosure provides a load protection system and a method of protecting a load. The load protection system comprises a PLC transmitter and PLC receiver logic, which are configured to communicate a plurality of bits of data, each bit transmitted near a zero-crossing of a voltage on the power lines supplying power to the load, in the form of a high frequency burst. The pulses are structured in two patterns. The first pattern serves to identify the start of the second pattern, and the second pattern includes the data of interest. The first pattern is unique and not represented within the second pattern. The load may comprise a motor, and the data may comprise a parameter value representing a parameter of the motor, for example a temperature of the motor, although any parameter based on a sensor input may be used. A motor controller may evaluate the parameter value to determine whether to institute a warning or alert action, to shut the motor down, or to continue operating the motor without instituting a warning or shut-down action.

In some embodiments, a method of transmitting information to monitor a submersible motor electrically connected to a first power conductor to receive power therefrom, the power having a voltage having a constant frequency, comprises determining a parameter value; encoding the parameter value; detecting a zero-crossing of the voltage; imposing, on the first power conductor, voltage bursts having a first frequency and arranged to transmit a message including a header followed by a payload including the encoded parameter value, each voltage burst imposed adjacent a positive or a negative zero-crossing of the voltage, wherein the header is comprised in a first pattern of voltage bursts that is not repeated within the payload to thereby enable detection of the header by a power line communications receiver; and after imposing the voltage bursts having the first frequency to transmit the message, transmitting the message by imposing the voltage bursts at a second, higher, frequency.

In some embodiments, a submersible motor configured to transmit information comprises a cylindrical housing; motor terminals operable to connect the submersible motor to a power cable; windings positioned in the housing and connected to the motor terminals, the motor terminals including a first motor terminal operable to connect a first winding of the windings to the first power conductor; and a power line communications (PLC) transmitter comprising: a transmitter controller; a power switch having a gate connected to the transmitter controller; and a power coupling component connected between the power switch and the first terminal. The PLC transmitter is configured to implement a communication method comprising determining a parameter value; encoding the parameter value; detecting a zero-crossing of the voltage; imposing, on the first power conductor, voltage bursts having a first frequency and arranged to transmit a message including a header followed by a payload including the encoded parameter value, each voltage burst imposed adjacent a positive or a negative zero-crossing of the voltage, wherein the header is comprised in a first pattern of voltage bursts that is not repeated within the payload to thereby enable detection of the header by a power line communications receiver; and after imposing the voltage bursts having the first frequency to transmit the message, transmitting the message by imposing the voltage bursts at a second, higher, frequency. The transmitter controller comprises logic operable to encode the parameter value, detect the zero-crossing of the voltage, and control the power switch to impose the voltage pulses via the power coupling component onto the first power conductor.

In some embodiments, a PLC receiver is configured to detect the voltage pulses transmitted by the PLC transmitter and decode the payload.

BRIEF DESCRIPTION OF THE DRAWINGS

In the drawings, corresponding reference characters indicate corresponding parts throughout the several views. Unless stated otherwise the drawings are not proportional.

FIGS. 2 and 3 are block diagrams of embodiments of a power system of the liquid supply system of FIG. 1 including a power line communications subsystem;

DETAILED DESCRIPTION

Embodiments of the invention include a method implemented by controllers comprising processing instructions which when executed implement the method. The invention also includes a motor comprising a PLC transmitter comprising one such controllers, and PLC receiver logic. The invention also comprises a PLC subsystem including the motor and the PLC receiver logic. The invention provides an effective low cost PLC subsystem for constant frequency motor applications.

Figure 1:
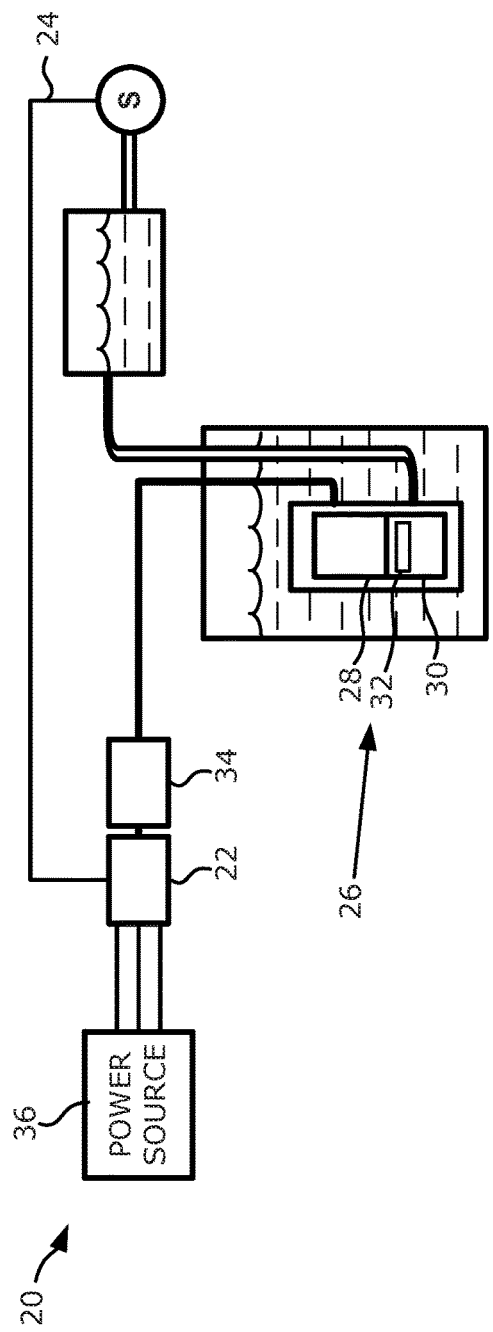
FIG. 1 is a diagrammatic representation of an embodiment of a liquid supply system.

FIG. 1 is a diagrammatic representation of an embodiment of a liquid supply system including a motor control system 20, a motor control 22, a pump unit 26, and a PLC receiver 34. The liquid supply system also includes a reservoir containing water which is pumped by pump-motor assembly (PMA) 26 through a conduit, optionally via a reservoir, e.g. a pressure tank, to a closed fluid system. PMA 26 includes a pump 28 driven by a motor 30 which is powered by motor control 22 via a cable including power conductors. Two or more power conductors may be used to provide single or three phase power to motor 30. Motor control 22 is connected to and draws power from a power source 36. Motor 30 includes a PLC transmitter 32. PLC receiver 34 is coupled to the power conductors and configured to extract therefrom communication signals transmitted by PLC transmitter 32. Although the present embodiment and those below may be described with reference to water, the invention is not so limited and the principles and advantages thereof may be applicable to any liquid. Example liquids include water, gasoline fuel, diesel fuel, petroleum, oil, sewage, and combinations of such liquids with gases and solids, such as water and coal-based methane gas. The reservoir may be an aboveground or underground tank, a well casing, or any other reservoir containing a liquid. The fluid system may be a water system in a home, in which case water flows out of the system when a faucet is opened or an irrigation system is turned on. Fluid characteristics including pressure, flow or level may be monitored with a sensor S to generate a signal to turn the motor on and off The signal is provided via line 24 connecting sensor S and motor control 22. Sensor S may also comprise a push-button which the user presses to turn the motor on and off, and may comprise any other contact/input from another control system which may be used to provide a run signal on line 24 to turn the motor on and off.

FIG. 2 is a block diagram of motor control system 20 comprising power source 36, motor control 22, PLC receiver 34 and motor 30. In the present embodiment conductors L1, L2, and L3 are connected to input contacts 50 of motor control 22 to provide two or three-phase alternating current (AC) power to motor control 22. In a variation thereof power source 36 provides single-phase power to motor control 22 over lines L1 and L2. Motor control 22 comprises a power switch 54, a motor controller 56, and output contacts 52 connected to submersible motor 30 via the power cable. Examples of power switches include relays, contactors, and gated power switches including silicone SCRs, IGBTs, and other MOSFET power switches. Generally, a relay or contactor includes a control coil that is energized to open or close the relay or contactor, where a gated power switch comprises a low voltage contact which is energized to enable conduction through high and low side contacts of the power switch. Motor controller 56 comprises control logic structured to receive a run signal over line 24 and activate power switch 54 responsive thereto. In the present embodiment, motor controller 56 activates power switch 54 when a user presses a push-button to engage the motor. In other embodiments, motor controller 56 activates power switch 54 when pressure or level is below a first setpoint and deactivates power switch 54 when the respective parameter is above a second setpoint, thereby energizing and de-energizing motor 30 to maintain pressure or level within a desired band. As described below, in some embodiments PLC receiver 34 transmits information to motor controller 56 over line 58. In one variation, the control logic determines, based on the information, whether to institute a warning or fault response. A fault response may comprise shutting down the motor. A warning response may comprise providing a fault alert or alarm. In another variation, the information is a signal which shuts down the motor by deactivating power switch 54. In some variations, the information comprises a temperature value of the submersible motor. A temperature of the submersible motor higher than expected could be indicative of a pump failure, for example if cooling water does not flow through to cool the motor, or a motor failure, for example an insulation failure causing unexpected current flow through the windings. PLC receiver 34 includes a PMA parameter signals sensing circuit 38, a signals processing circuit 40, a voltage processing circuit 42, and a receiver controller 44. As described below with reference to various figures, PMA parameter signals sensing circuit 38 may comprise current transformers 104, 106, and/or 108. PMA parameter signals sensing circuit 38 may also comprise VPC 118. PMA parameter signals sensing circuit 38e may comprise a voltage divider or other circuits structured to sense voltage and communicate the voltage signals to the PLC receiver logic. Signals obtained by PMA parameter signals sensing circuit 38, 38e may be processes as described below to obtain pulses corresponding to voltage bursts and also signals corresponding to zero-crossings. In one embodiment, the voltage on the power conductor is digitized at a sampling rate greater than the second high frequency by a digital signal processor that also determines from the sampled voltages the zero-crossings and the voltage bursts, and thereafter decodes the parameter value(s). Various logic may be used depending on whether one or more parameters are sensed, to optimize cost and signal detection. Of course the message can also be transmitted at additional frequencies.

Figure 13:
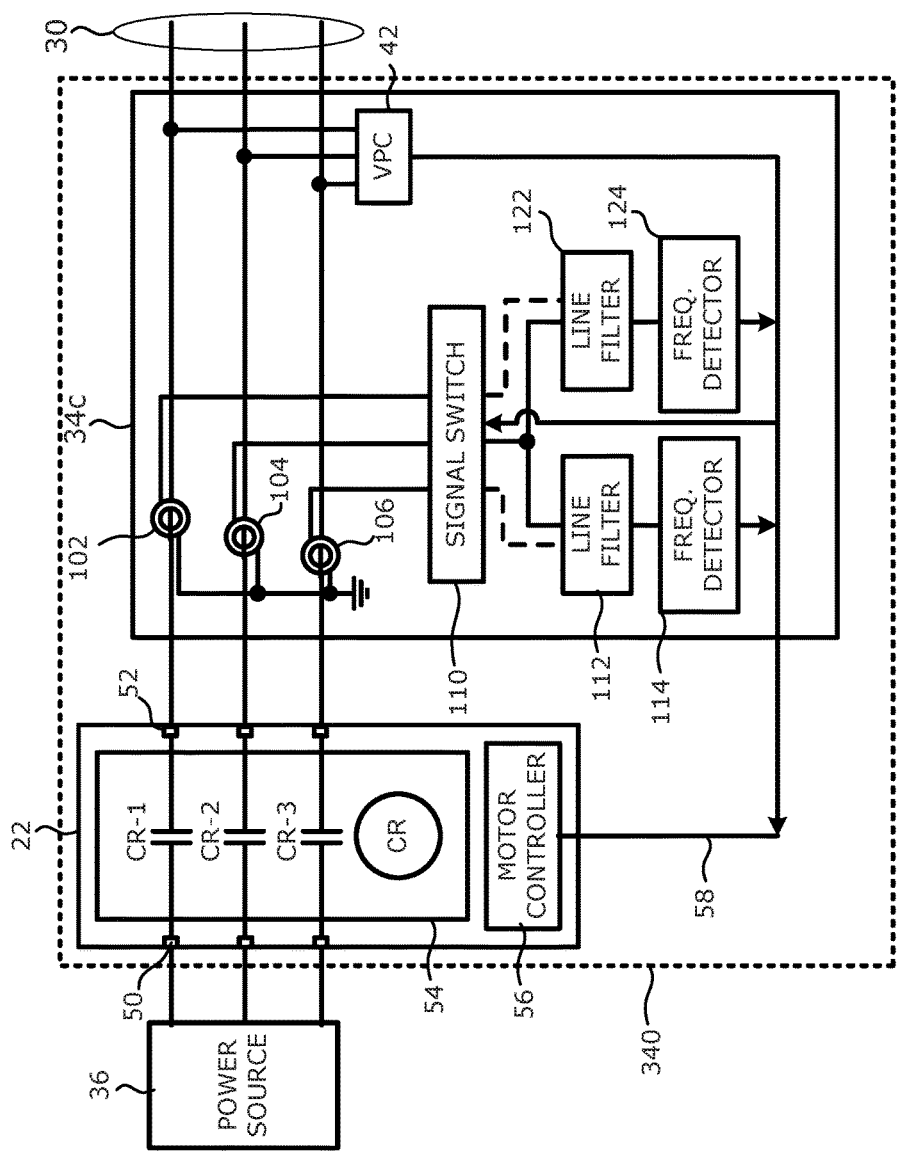

In some variations of the present embodiment, motor control 22 and PLC receiver logic 44' may be integrated in a common enclosure, shown in FIGS. 3 and 13. Motor controller 56 may also incorporate the receiver logic 44' (shown in FIG. 3), thereby motor controller 56 may be coupled directly to the signal processing component 40 (described below).

Motor 30 is a submersible AC motor including a housing 60, motor windings 62, 64, 66 positioned in housing 60 and having first and second winding leads 72, 74 adapted for connection to the power cable to receive power having a line frequency. As an example of the present embodiment, a temperature sensor T is communicatively coupled to PLC transmitter 32, which is electrically connected to first and second winding leads 72, 74. PLC transmitter 32 is configured to output on at least one of first and second winding leads 72, 74 high frequency voltage bursts P1-P7 (described with reference to FIG. 11) comprising a first predetermined pattern 322 and a PMA parameter value pattern 324 based on a temperature value of a temperature sensed by temperature sensor T. Each of the high frequency voltage bursts are output within a predetermined time from a zero-crossing of a voltage 320 on one of the first and second winding leads. In a variation of the present embodiment, motor 30 further comprises a third winding, 76, and PLC transmitter 32 is coupled to the three windings. In some variations, PLC transmitter 32 is only coupled to a pair of the windings. Downstream of winding leads 72, 74, 76 are windings 62, 64, 66 connected at a neutral, or wye, point 68. Winding leads 72, 74, 76 may be referred to as the input leads of the motor.

FIG. 3 is a block diagram of motor control system 20 comprising power source 36, motor control 22 including PMA parameter signals sensing circuit 38, signals processing circuit 40, voltage processing circuit 42, and PLC receiver logic 44'. In the present embodiment, PLC receiver logic 44' is incorporated with motor controller 56, which receives signals from signals processing circuit 40 and voltage processing circuit 42. In accord with descriptions below, motor controller 56 may calculate power and determine power faults based on predetermined power fault thresholds, may determine zero-crossings based on digital voltage signals from voltage processing circuit 42, and may also determine when a proper message has been transmitted.

Figure 4:
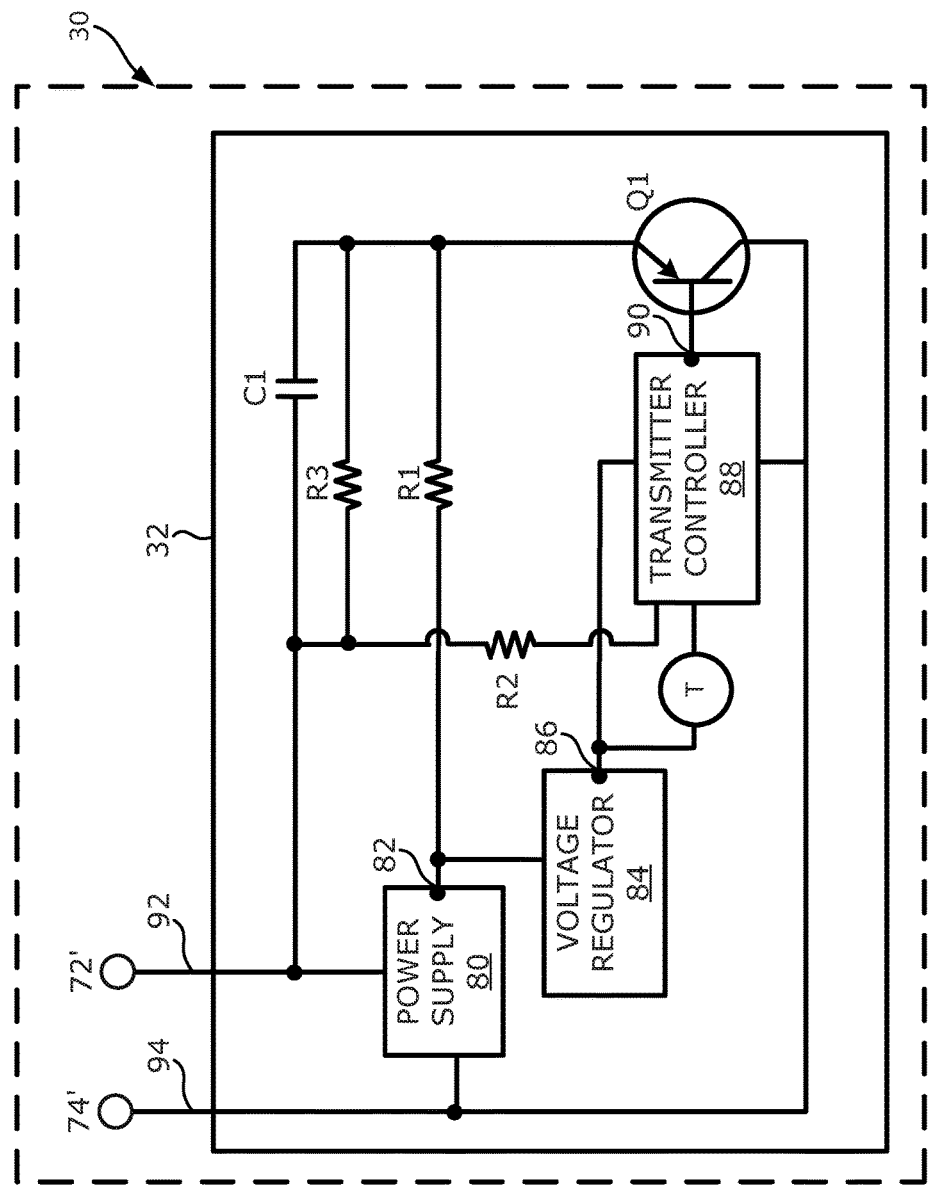
FIG. 4 is a schematic diagram of an embodiment of a transmitter of the power line communications subsystems of FIGS. 2. and 3.

Motor control system 20 will now be described in more detail with reference to FIGS. 4 to 8. Referring to FIG. 4, PLC transmitter 32 comprises two leads 92, 94 connecting a power supply 80 to first and second terminals 72', 74' of motor 30, which are connected to first and second winding leads 72, 74. Power supply 80 receives a relatively high (e.g. 200-600 volts) voltage through first and second terminals 72', 74' of motor 30 and outputs low DC voltage at a direct current (DC) low voltage output contact 82. The low DC voltage supplied via output contact 82 may be less than 40 $V_{DC}$, preferable less than 25 $V_{DC}$, and more preferably about 15 $V_{DC}$. The low DC voltage is provided to a voltage regulator 84 electrically connected to DC low voltage output contact 82. A transmitter controller 88 is connected to a regulated voltage output contact 86 of voltage regulator 84 and receives a regulated voltage therefrom. The regulated voltage may comprise, for example, 5 $V_{DC}$. Transmitter controller 88 has a control output contact 90 coupled to the gate of a power switch Q1, illustratively a power transistor, which is connected on its high-side contact to first winding lead 72 via a capacitor C1 and a resistor R3 configured, in combination, to shape the pulses, and on its low-side contact to second winding lead 74. A resistor R1 connects DC low voltage output contact 82 to the high-side contact of Q1. Temperature sensor T is connected to output contact 86 and an input contact of transmitter controller 88. Transmitter controller 88 comprises switching logic configured to generate first predetermined pattern 322 and PMA parameter value pattern 324 based on the temperature of temperature sensor T and a zero-crossing of voltage 320, which the switching logic determines from its connection via a resistor R2 to first winding lead 72, for example by detecting a polarity switch of the voltage. Resistor R2 may have a resistance exceeding 1.0 MΩ. In operation, transmitter controller 88 outputs gate signals corresponding to voltage bursts P1-P7, and Q1 generates voltage bursts based on the gate signals, which cause capacitor C1 to generate voltage bursts P1-P7 onto first winding lead 72.

In a variation of the present embodiment, transmitter controller 88 outputs the gate signals at periodic intervals. In another variation, transmitter controller 88 outputs the gate signals at a first, high, frequency, and subsequently outputs the gate signals at a second, higher, frequency, before again outputting the gate signals at the first frequency, and repeating the alternating sequence of high and higher frequency bursts at periodic intervals. Transmission at fixed first and second frequencies advantageously provides the system the ability to operate based on the frequency with the better signal-to-noise ratio while doing so with circuitry that is physically small enough to fit within the motor's housing and is relatively inexpensive compared with systems that transmit in broadband from the neutral point. In some variations, the high, or first, frequency is 125 Khz and the higher, or second, frequency is 333 Khz.

Figure 5:
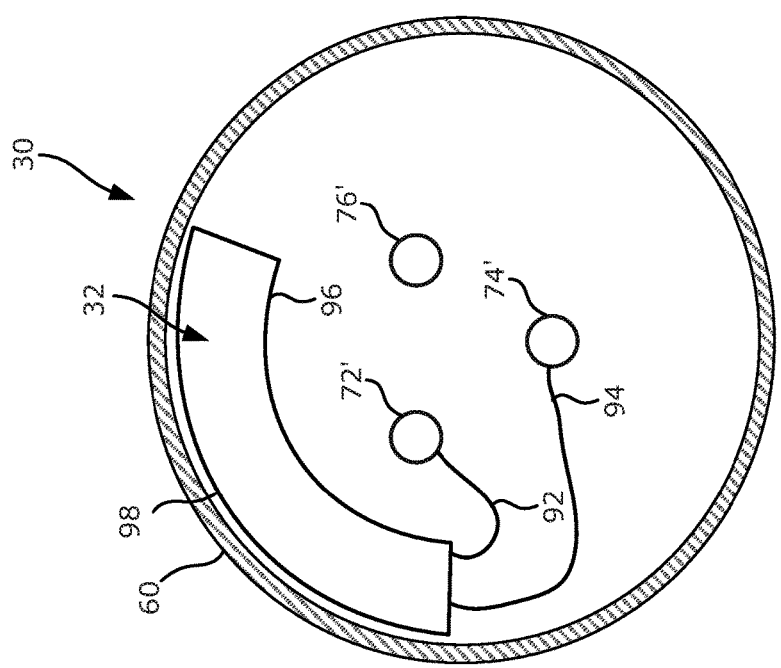
FIG. 5 is a cross-sectional view of an embodiment of a motor including a power line communications transmitter.

Referring to FIG. 5, in one variation PLC transmitter 32 has an arcuate elongate shape comprising an inner arcuate surface 96 and opposite an outer arcuate surface 98, and is sized to fit around terminals 72', 74', 76' of motor 30. Motor 30 has a cylindrical enclosure, e.g. enclosure 60, and outer arcuate surface 98 is shaped to match the inner surface of a tubular portion of enclosure 6. As shown, leads 92, 94 of PLC transmitter 32 are connected to terminals 72', 74' of motor 30. Windings 62, 64, 66 are connected to terminals 72', 74', 76' at one end and to each other at neutral point 68 on the opposite end. PLC transmitter 32 comprises a circuit board on which all the components shown in FIG. 4 are mounted. A thermistor may be mounted on the circuit board or connected to it and positioned elsewhere. The circuit board and components are encapsulated to seal out moisture. The motor may experience high pressures, for example about 500 PSI at certain depths. In some embodiments the encapsulation method seals the circuit board and components to withstand the high pressures. Encapsulation may comprise overmolding with a polymer or potting in place, for example with epoxy. Leads 92, 94 may protrude from the encapsulated structure. Additional sensors may also be provided. The signals from the sensors are encoded as described. below with reference to motor parameters such as temperature, and the coded values are included in the PLC message.

As described previously PLC receiver 34 includes a PMA parameter signals sensing circuit 38, a signals processing circuit 40, a voltage processing circuit 42, and a receiver logic 44'. In the following figures variations of PLC receiver 34, including variations of PMA parameter signals sensing circuit 38, signals processing circuit 40, and voltage processing circuit 42 will be described. Variations of devices may be denoted by an alphabetical suffix (e.g. 34a . . . 34d).

Figure 6:
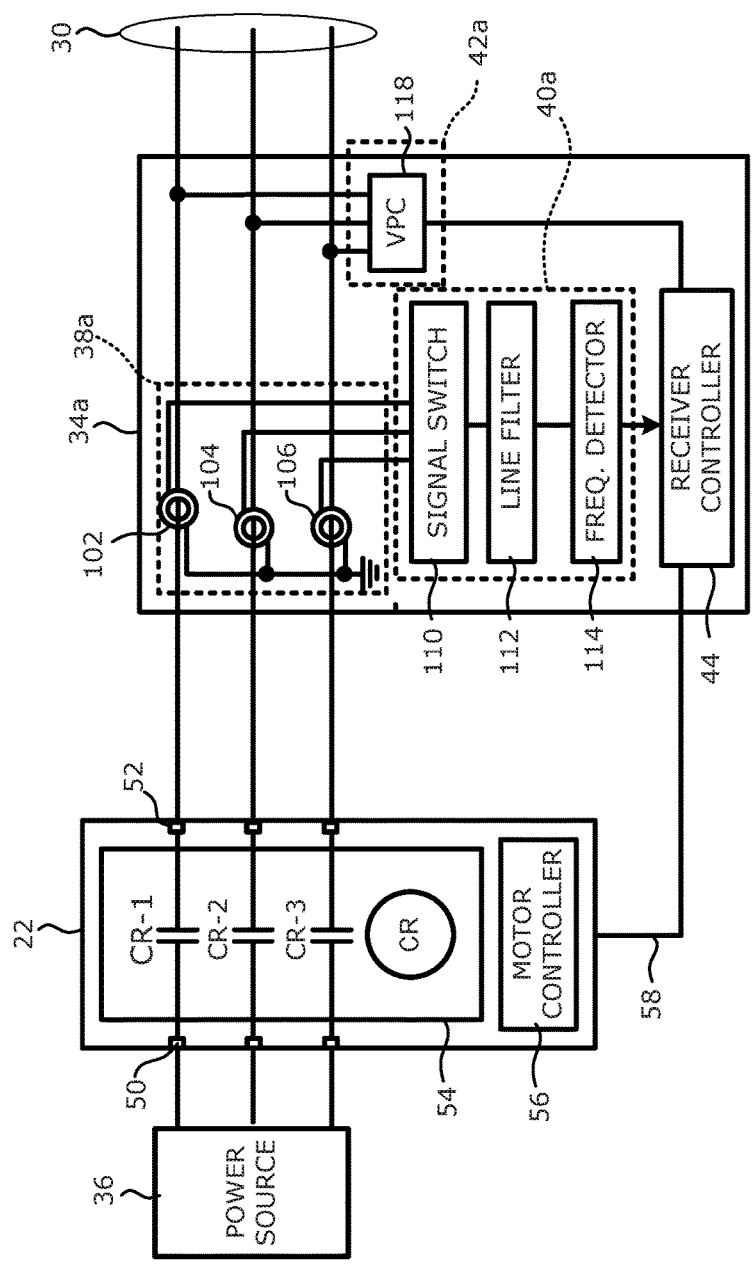
FIGS. 6-8 are schematic diagrams of embodiments of power systems including variations of power line communications receivers.

Referring to FIG. 6, PLC receiver 34 comprises a PMA parameter signals sensing circuit 38a comprising first, second, and third current transformers 102, 104, 106 inducing signals corresponding to the line voltage and the high frequency voltage bursts representing the PMA parameter value. An example of a PMA parameter is a temperature of the motor. Other PMA parameters include motor voltage, current, pump pressure, vibration, moisture, and any other parameter which may be measured, sensed, or determined based on measured or sensed parameters. PLC receiver 34 also comprises a signals processing circuit 40a, comprising a signal switch 110, a line filter 112, and a frequency detector 114. Signal switch 110 is an analog switch controlled by the receiver logic to connect the current transformers to line filter 112, in sequence, until the receiver logic can identify on which of the multiphase power lines the communication signals are imposed. In operation, receiver logic 44' attempts to interpret the signals received from frequency detector 114 and then causes signal switch 110 to couple a subsequent current transformer to line filter 112, then attempts to interpret the signals received from frequency detector 114 again, until one of the transformers communicates the expected signals. In this manner receiver logic 44' of receiver controller 44 can receive the sensor data without knowing a priori over which conductor the data will be transmitted.

The line filter may be an active high pass filter or a notch filter configured to pass through the desired frequencies. In one example, the line filter comprises an RC circuit coupled to an input pin of a non-inverting op-amp. Line filter 112 is electrically connected to the current transformers and configured to filter the line frequency of power source 36 from the signals induced by the current transformers. The line filter could also be a three-stage filter configured to amplify the output of the current transformers.

Frequency detector 114 is electrically connected to the line filter and configured to generate output pulses corresponding to the voltage bursts. Frequency detector 114 may be a one-stage peak detector comprising an op-amp. The frequency detector outputs a pulse corresponding in duration to the duration of the burst, and a voltage level similar to the peak voltage of each pulse in the burst, as detected by the current transformers. In some embodiments, the frequency detector comprises an envelope detector as is known in the art. The output of the frequency detector is a pulse, such as a square wave pulse, whose duration corresponds in time with the duration of the high frequency voltage burst. In some examples, the square wave pulse is about between 1-2 milliseconds in duration. Frequency detectors may comprise RC circuits or other logic described below.

In one variation receiver controller 44 controls signal switch 110 to test each conductor during a self-configuration step and then operates on the conductor that produces actionable data. The self-configuration step may be performed by receiver controller 44 each time it powers-up, in case the motor is rewired. Receiver controller 44 may sense whether the frequency detector produces a signal and, if no signal is produced after a few seconds, cause signal switch 110 to switch to a different phase/conductor.

PLC receiver 34 (34a) also comprises a voltage processing circuit 42a. In some embodiments voltage processing circuit (VPC) 42a is a standard integrated circuit 118 that senses the power lines voltages and based thereon outputs signals representative of the amplitudes of the voltages. In one variation, VPC 42a digitizes the voltages and outputs digital signals corresponding to the amplitudes. In some variations, VPC 42a also receives signals from the current transformers, digitizes the signals, and outputs digital signals corresponding to the amplitudes of the currents. The voltage and current signals may be used to calculate power and define fault thresholds to protect the motor or the motor controller. In some variations, VPC 42a includes logic to determine zero-crossings of the power lines and outputs signals indicative of the zero-crossings of the power lines. The logic may comprise comparators to detect voltage polarity transitions. In some embodiments, voltage processing circuit 42a is a zero-crossing detector of any known configuration, including configurations comprising opto-couplers and diodes arranged to cause the opto-couplers to generate pulses whose rising or falling output voltage edges indicate a zero-crossing of the respective input voltage, as is known in the art. In some variations, a zero-crossing circuit is included to detect the zero-crossings of the voltage on the power conductors. In some embodiments, voltage processing circuit 42a comprises a voltage sensing circuit and a processor programmed to analyze the amplitude of the voltage and detect the zero-crossing.

Receiver controller 44 is electrically connected to high frequency detector 114 and voltage processing circuit 42a. Receiver controller 44 is also configured to receive zero-crossing signals from voltage processing circuit 42a. Receiver controller 44 includes receiver logic configured to detect in the output pulses, within timing windows based on the zero-crossings determined from the zero-crossing signals, the first predetermined pattern and, responsive to detecting the first predetermined pattern, to detect the second pattern and to decode the second pattern to extract the PMA parameter value. In some embodiments, the second pattern comprises a trinary pattern configured to distinguish the first predetermined pattern regardless of the data, or payload, in the second pattern. Receiver controller 44 also includes an output configured to send a signal to motor controller 56 comprising the PMA parameter value or, in some embodiments, to determine a fault condition based on the PMA parameter value and to send a signal that shuts down the motor of the fault condition is determined.

Motor control 22 includes power switch 54. In FIG. 6, power switch 54 is shown as a relay having a coil CR and contacts CR-1, CR-2, and CR-3. Motor controller 56 is coupled to coil CR and energizes coil CR to power or disengage the motor. In some embodiments motor controller 56 comprises logic configured to interpret the signal transmitted on line 58 and to determine based thereon whether a fault has occurred, and to take responsive action. In some embodiments, the signal transmitted on line 58 is a binary signal intended to, in one state, permit motor controller 56 to control the motor, and in the opposite state to disable the relay.

In the figures below variations of PLC receivers 34 will be described. While the sensing and processing circuits differ, providing different benefits such as simplicity and low cost or redundancy and ease of installation, the PLC receives generally obtain signals from the power lines, process the signals, and decode the processed signals to obtain the PMA parameter value. As will be described, the sensing circuits can operate by detecting current or voltage. The sensing circuits may be configured to sense all the power lines or just one or two of them.

In any of the described embodiments, the line filters may be positioned intermediate the current transformers or other voltage burst detecting sensors and the signal switch, so that the switched signals are filtered. The filtered signals are then processed by the frequency detectors.

Figure 7:
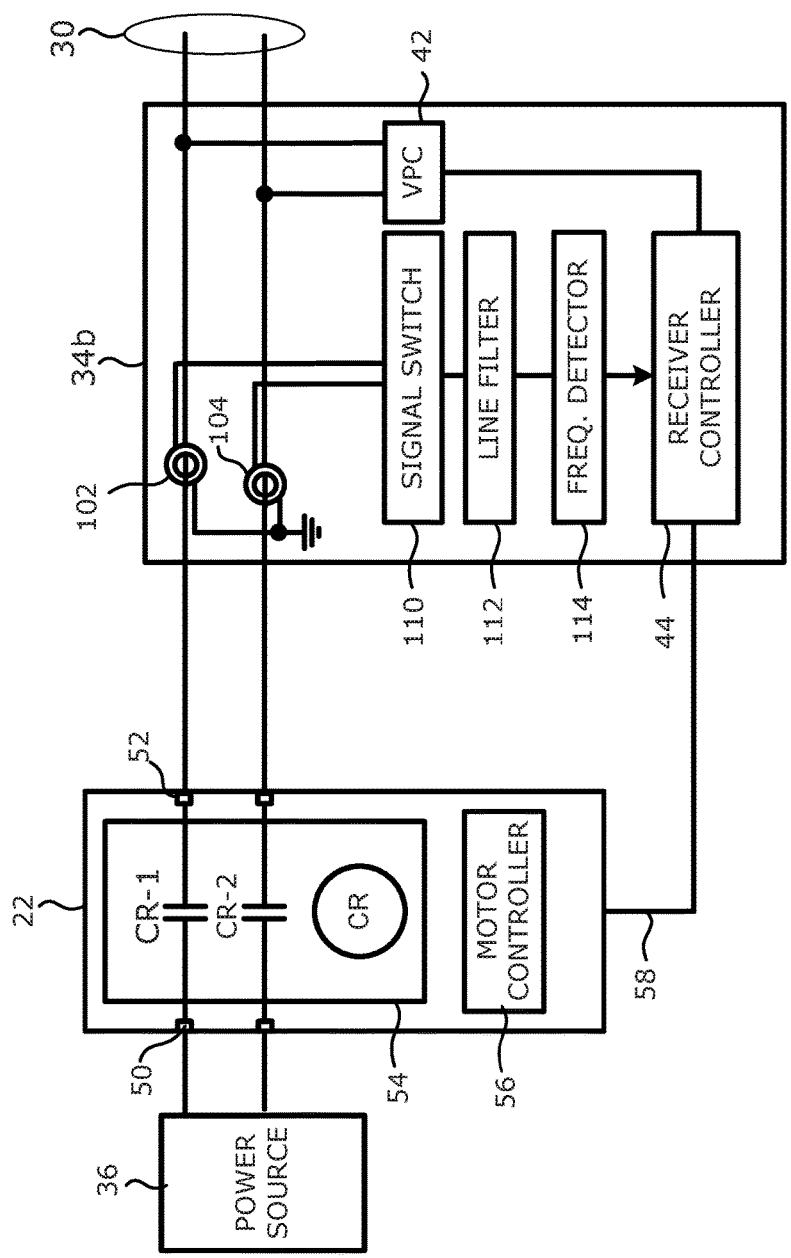

Referring to FIG. 7, in one embodiment PLC receiver 34 (34b) comprises first and second current transformers 102, 104 inducing signals corresponding to a single-phase voltage and the high frequency voltage bursts, signal switch 110, line filter 112 electrically connected to signal switch 110, and frequency detector 114 electrically connected to line filter 112, as described with reference to FIG. 6. Signal switch 110, line filter 112 and frequency detector 114 function as previously described. PLC receiver 34 is configured to detect in the high frequency output bursts first predetermined pattern 322 and, responsive to detecting the first predetermined pattern, to detect the parameter value in PMA parameter value pattern 324. Otherwise receiver controller 44 and voltage processing circuit 42 operate as described with reference to FIG. 6.

In a variation of the embodiment described with reference to FIGS. 6 and 7, signal switch 110 is omitted and line filter 112 comprises a high-pass filter with a corner below the first and second frequencies. Line filter 112 detects the voltage bursts regardless on which of the power conductors the voltage bursts are imposed.

In some variations, the functions of line filter 112, frequency detector 114, and receiver logic 44' are performed by a digital signal processor which evaluates the signals sampled from the current transformers and either outputs the parameter values or compares them to threshold values and outputs signals indicative of faults corresponding to the parameter values which are outside expected ranges. The digital signal processor may sample the outputs of the current transformers at, for example, 2 MHz, which is a multiple of the second frequency.

Figure 8:
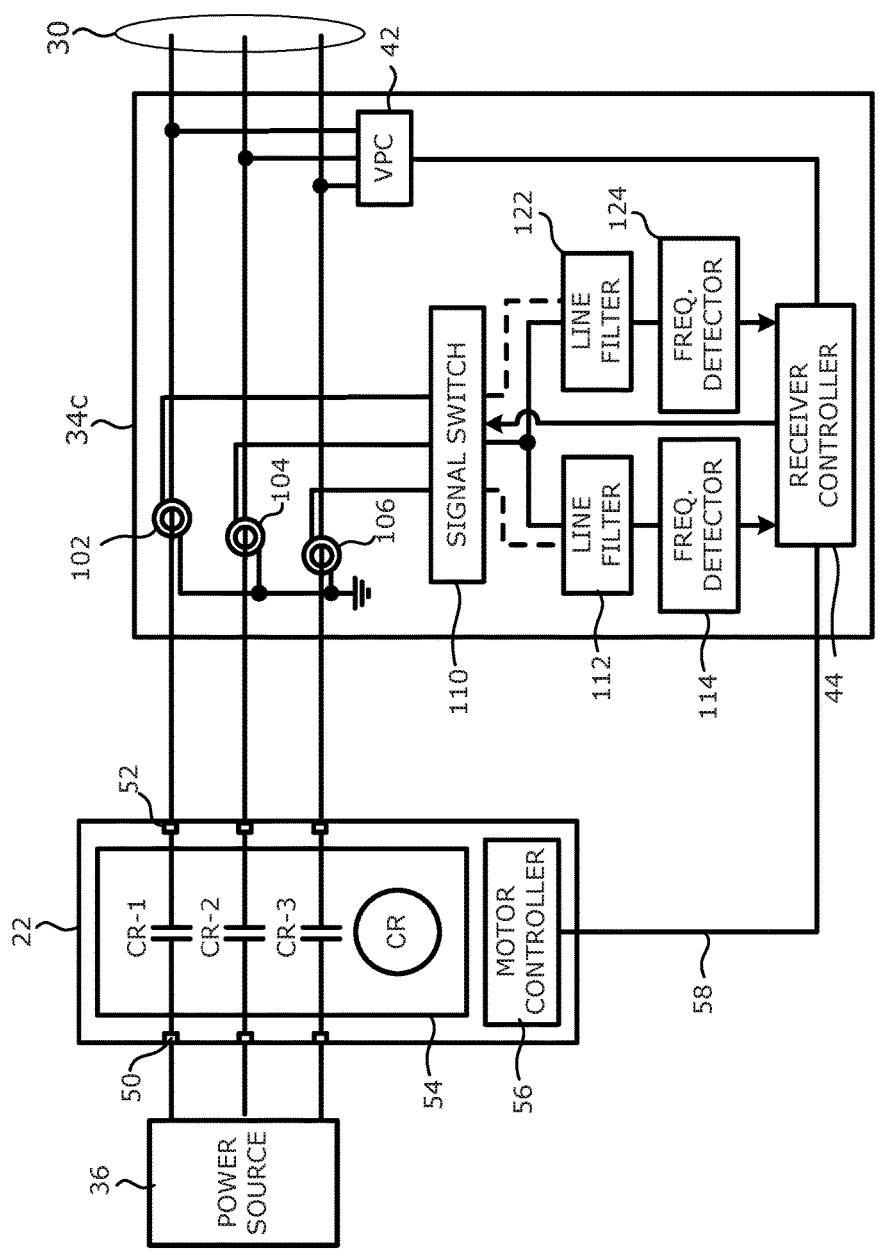

Referring to FIG. 8, in some variations PLC receiver 34 (34c) comprises first, second, and third current transformers 102, 104, 106, signal switch 110, line filter 112 electrically connected to signal switch 110, and frequency detector 114 electrically connected to line filter 112, as described with reference to FIG. 6. In the present embodiment, PLC receiver 34 also comprises a line filter 122 electrically connected to signal switch 110, and a frequency detector 124 electrically connected to line filter 122. Line filter 122 and frequency detector 124 function as line filter 112 and frequency detector 114 except that they are tuned to detect signals pulsed at a different frequency. Signal switch 110 is controlled by the receiver logic to connect the current transformers to line filter 112 and line filter 122 one current transformer at the time. The presence of two line filters enables tuning of the filters to the first and second frequencies, which improves noise discrimination.

Figure 9:
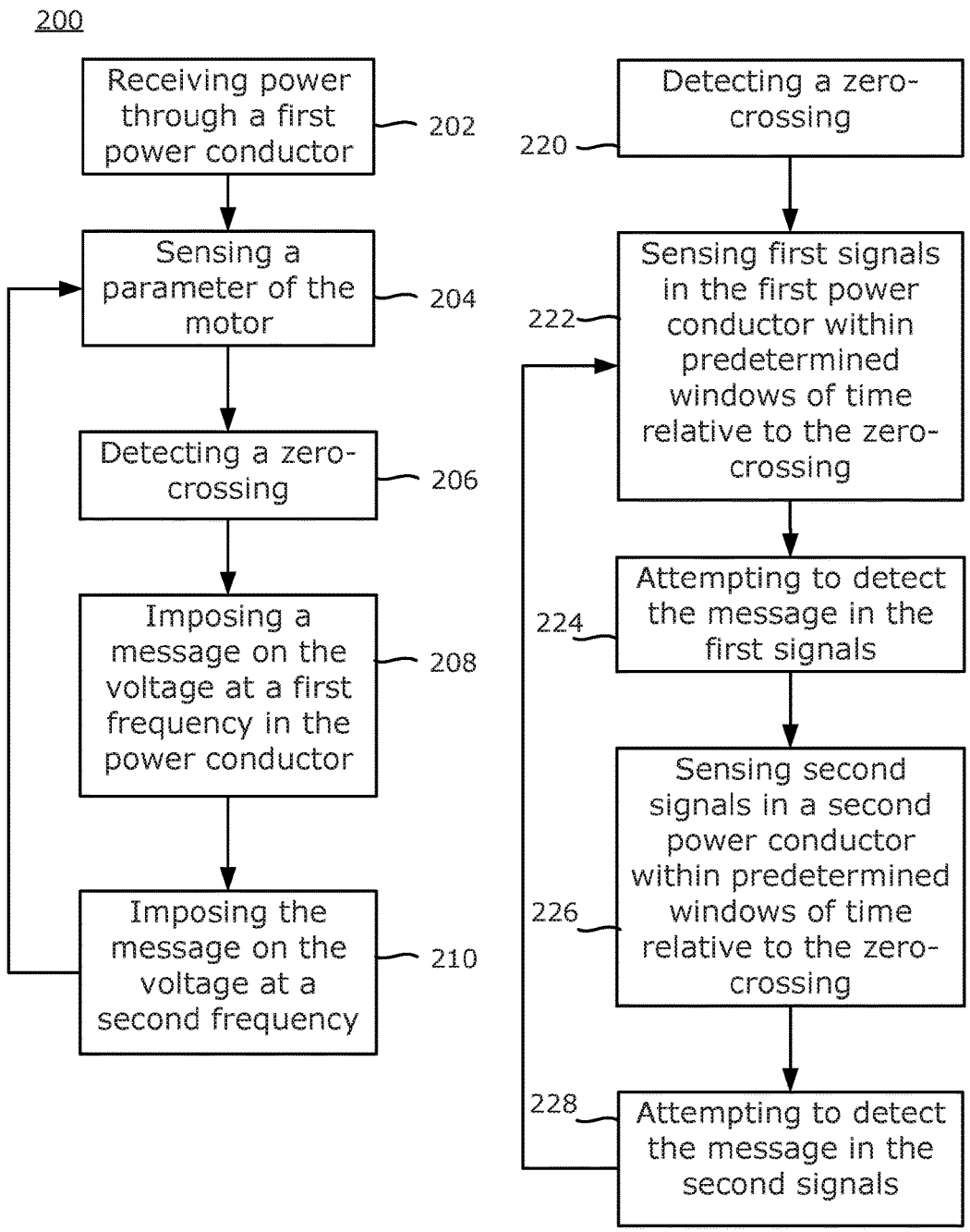
FIG. 9 is a flowchart of an embodiment of a power line communications method.
Figure 10:
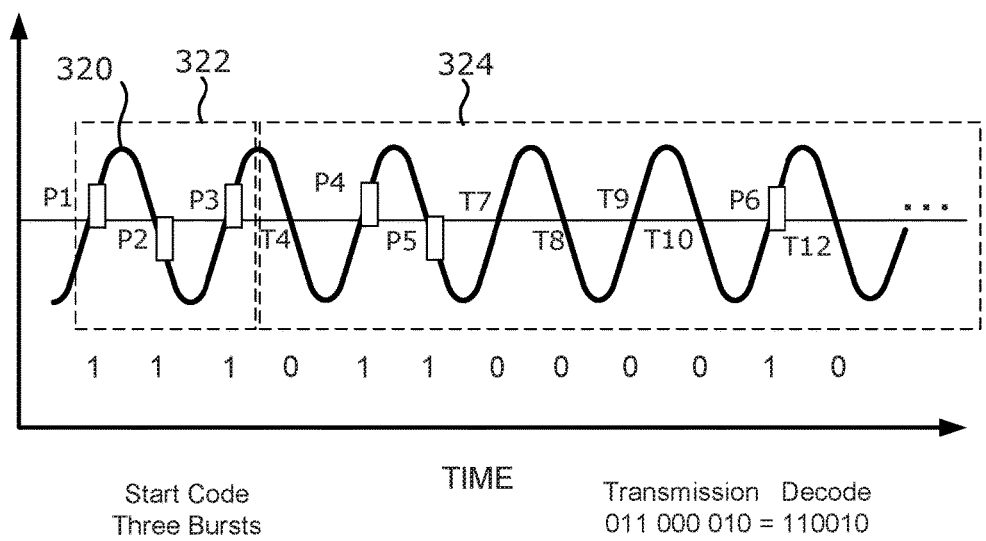
FIG. 10 is a representation of a communication protocol embodied by the receiver of FIG. 2.
Figure 11:
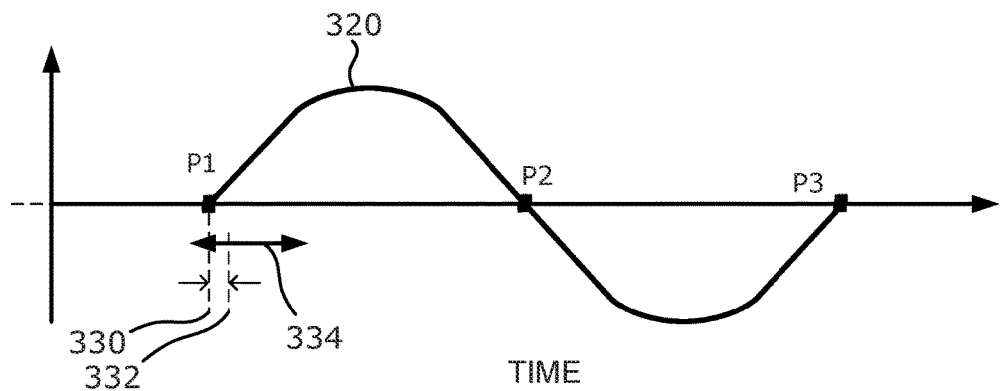
FIG. 11 is another representation of the communication protocol of FIG. 9.

Having described the components of the PLC subsystem, we will now describe a PLC method with reference to FIGS. 9-11. FIG. 9 is a flowchart of an embodiment of a PLC method 200. The method may be implemented with the PLC subsystem described above. Boxes 202-210 illustrate operation of the PLC transmitter and boxes 220-228 illustrate operation of the PLC receiver. The method begins, at 202, by receiving power through a first power conduct. The power comprises a constant voltage, illustratively the line voltage or a corresponding voltage stepped up or down by a transformer.

The method continues, at 204, by sensing a PMA parameter. The parameter is sensed by a sensor connected to the PLC transmitter. More than one parameter may be detected. Of course the sensor may be incorporated with the PLC transmitter, e.g. temperature, position, vibration sensors, etc.

The method continues, at 206, by detecting a zero-crossing. The zero-crossing may be of the voltage or current of the received power. Detection of the zero-crossing enables transmission during a time period in which voltage is low and also synchronization with the PLC detector. The zero-crossing may be detected before each transmission, at periodic intervals, or on start-up. More than one zero-crossing may be detected to determine the frequency of the power. Once the frequency is determined, it may not be necessary to continue detecting zero-crossing except perhaps to confirm and adjust for variations or errors in measurement over time.

The method continues, at 208, by imposing a message on the voltage on the power conductor at a first frequency. The message has a header and a payload. The header is coded with a predetermined pattern to enable the detector to identify the beginning of the message. The payload has a predetermined structure. Once the header is identified, the payload can be decoded to extract the relevant values comprised therein. The payload can comprise any number of parameter values or other data. The message is imposed by imposing voltage or current bursts timed to occur near in time to the zero-crossings, whether the zero-crossings were detected or predicted based on the frequency. Each burst is imposed on a different zero-crossing window. In some embodiments, each burst lasts about 1.0 msec. and is imposed after the corresponding zero-crossing. In one example, each burst is triggered by a corresponding zero-crossing. In some embodiments, each burst lasts about 1.0 msec. and is imposed to overlap in time with the corresponding zero-crossing.

The method continues, at 210, by imposing the message on the voltage on the power conductor at a second frequency higher than the first frequency. In variations of the present embodiment the message may be imposed at additional frequencies. The PLC receiver will attempt to detect the message and, depending on the distance between the PLC receiver and the PLC transmitter, the voltage, and other factors, one of the frequencies will transmit the message with a stronger signal-to-noise ratio than the others and will therefore be easier to detect and decode correctly. After attempting to detect the message on both frequencies the PLC detector, in embodiments possessing the capability, will switch to detect the message on a different power line/phase.

Imposing of the message at the first and second frequency continues repeatedly. Sensing of the parameter and the zero-crossing may be performed in any order and more or less frequency than the message is transmitted.

The method includes, at 220, detecting a zero-crossing by the PLC receiver. The zero-crossing may be detected before each transmission, at periodic intervals, or on start-up. More than one zero-crossing may be detected to determine the frequency of the power. Once the frequency is determined, it may not be necessary to continue detecting zero-crossings except perhaps to confirm and adjust for variations or errors in measurement over time. The sensing window is timed based on preceding zero-crossings.

The method includes, at 222, sensing first signals in the first power conductor within predetermined windows of time relative to the zero-crossing. In one variation, the predetermined window begins 1 msec. before the zero-crossing and ends 2 msec. after the zero-crossing. The zero-crossings may comprise predicted zero-crossings in addition to detected zero-crossings. The windows are provided to reduce computational costs by preventing detection or decoding of signals during times in which it is certain that signals are not transmitted, while also allowing for variations between the zero-crossings at the PLC receiver and the zero-crossings at the PLC transmitter due to time lags. Because the motor may be located thousands of feet below the surface, there may be a time gap between the PLC receiver and transmitter (e.g. surface and down-hole) zero-crossings.

The term "first" merely indicates that signals are initially sensed on one of several power conductors. It is often the case that the installer does not know on which of the power conductors the PLC transmitter is coupled. In various embodiments signals are sensed in each power conductor in succession, to empirically determine on which conductor the PLC transmitter is coupled. Thus the power conductors are referred to as "first", "second", and "third" power conductor, without the terms indicating a particular order.

The method comprises, at 224, attempting to detect the message in the first signals. Attempting to detect comprises evaluating the signals and comparing them to expected patterns. If the signals were not present or the pattern is not recognized, then detection fails. On the other hand if detection is successful, in one variation the method does not include sensing second signals in a second power conductor, as long as the first signals are of sufficient quality.

The method comprises, at 226, sensing second signals in the second power conductor within predetermined windows of time relative to the zero-crossing. In one variation of the present embodiment, the receiver controller operates the signal switch to connect a different current transformer to the line filter(s) and frequency detector(s). Line filters are well known and will not be discussed further. The frequency detectors may integrate the signals to generate a pulse corresponding to each voltage burst, and then output the pulse to the receiver controller, so that the receiver controller via the receiver logic can determine if the pulses correspond to valid bits, e.g. received within valid windows, or noise, if the pulses arrive outside the expected windows of time. Valid bits are then decoded.

The method comprises, at 228, attempting to detect the message in the second signals. Attempting to detect the message in the first and second signals continues repeatedly or at desired intervals. Sensing of the parameter and the zero-crossing may be performed in any order and more or less frequency than the attempts to detect the message.

The PLC receiver may compare the various detection attempts to determine on which power conductor the message is conveyed, for example by failing to detect the message on some attempts or by considering any signal quality measure such as signal-to-noise ratio or signal strength comparison. Once the PLC receiver determines on which conductor the message is being transmitted, it may discontinue message detection efforts on the other power conductors, thereby reducing computational costs.

Examples of message structures will now be described with reference to FIGS. 10 and 11. Referring now to FIG. 10, six constant frequency cycles, e.g. 60 Hz, are depicted on a voltage line 320. Each cycle includes a leading zero-crossing and a trailing zero-crossing, as is well known. A number of voltage bursts are depicted as P1-P6. Bursts P1, P3, P4, and P6 are imposed adjacent leading zero-crossings while bursts P2, and P5 are imposed adjacent trailing zero-crossings. In the present embodiment, the message header, or first predetermined pattern 322, includes bursts (P1-P3) imposed on three contiguous constant frequency half-cycles. First predetermined pattern 322 can be detected, for example, by detecting at least three consecutive bursts, e.g. P1, P2, P3. Additional bursts may be incorporated in the first predetermined pattern to increase redundancy and certainty.

The payload, in this example a PMA parameter value pattern 324, follows first predetermined pattern 322. Of course PMA parameter value pattern 324 may convey values other than or in addition to temperature. Examples of different parameters include pressure, voltage, current, vibration, and any other parameter that can be sensed with a sensor. Examples of different parameters also include parameters of the same type but sensed at different points, e.g. different temperatures.

As shown, PMA parameter value pattern 324 comprises the trinary value 011-000-010, which is decoded to a binary value 11-00-10 by removing the leading zero. The trinary values will always have a leading zero and therefore cannot be confused with a header. Of course the number of bursts in value pattern 324 are selected to transmit a data value as large as desired, in whichever measurement system units are desired. Because each binary bit of information is conveyed on a voltage half-cycle, the present communication protocol is slow relative to complex encoding protocols which transmit multiple bits of data over one voltage cycle. But because some motor parameters, such as temperature, generally vary slowly, the present communication protocol is sufficient to convey PMA, parameter values and, as described previously, the slower transfer rate enables manufacture of a small and inexpensive PLC subsystem.

FIG. 11 illustrates imposition of bursts P1-P3 relative to a cycle of the voltage of the power. Also shown is a line 330 corresponding to the leading zero-crossing at the PLC receiver and a line 332 illustrating a zero-crossing at the PLC transmitter. The lines represent when the crossings actually occur, and the distance between the lines decreases with shorter cable lengths. A line 334 illustrates the duration of a detection window. The duration is sufficiently long, e.g. 3 msec., to encompass timing variations between the receiver and transmitter zero-crossings. The detection window may start before the zero-crossing at the receiver. In the present example, the detection window is 3 times longer than the duration of the burst. The graph shown in FIG. 11 illustrates a voltage cycle having a duration of about 16.7 msec., corresponding to 60 Hz, 1 msec. bursts, and a 3 msec. detection window. The durations are substantially to scale.

In some embodiments, the payload comprises a sensor type code followed by a parameter value followed by a checksum value. In other embodiments the payload comprises any number of sensor type/parameter value to transmit data from any number of sensors, then a checksum value.

Other protocols may be used, introducing zeros (e.g. skipping cycles) for increased verification and noise determination. Forward error correction may be applied to increase verification and noise detection.

Motor controller 56, transmitter controller 88, and receiver controller 44 comprise logic structured to perform various functions. The term "logic" as used herein includes software and/or firmware comprising processing instructions executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

The PLC receiver logic receives an input voltage corresponding to the motor voltage, which it monitors to detect a zero-crossing of the motor voltage, which has a constant frequency and amplitude, and also receives a signal from the frequency detector. The receiver logic compares frequency detector signals at intervals corresponding to the frequency and accounting for the detection window, attempting to identify three consecutive signals. For example, the signals may be spaced every 8.3 msec. at a 60Hz motor voltage frequency or 10.0 msec. at a 50 Hz motor voltage frequency. In one example, each signal must be received within the detection window or is ignored. Once three consecutive signals are detected, the receiver logic determines that the header of the message was transmitted and begins to read signals from the frequency detector at every period corresponding to a half-cycle (e.g. every 8.3 or 10.0 msec) to detect leading or trailing zero-crossing pulses. The receiver logic then places the received values in memory or decodes the received values to restore the value of the parameter encoded per the previously described protocols.

The receiver logic may also include a parameter limit and may compare the parameter limit to the parameter value and determine, if the value exceeds the limit, to signal the motor controller to indicate a fault, for example an over-temperature fault. Other faults may be indicated in a similar manner by storing additional parameter limits.

The transmitter logic works in a reverse manner. It first encodes a parameter value per the above described protocols, then switches Q1 to generate the corresponding pulses at the various frequencies. The PLC transmitter controller may include an analog-to-digital converter (ADC) to convert a voltage signal from a thermistor to the digital parameter value that is subsequently encoded. In another example the temperature sensor may comprise a digital output, in which case the ADC is not needed.

Figure 12:
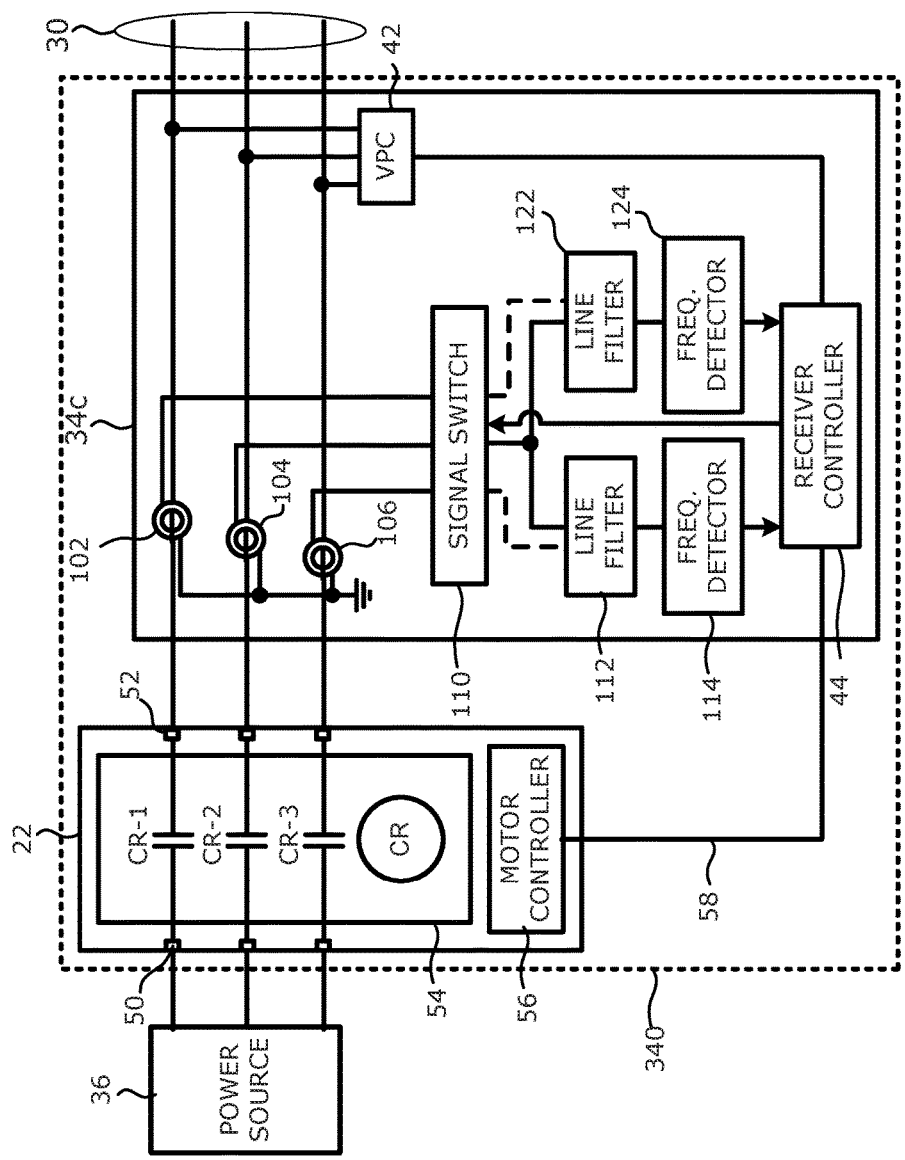
FIGS. 12-15 are schematic diagrams of additional embodiments of power systems including variations of power line communications receivers.
Figure 14:
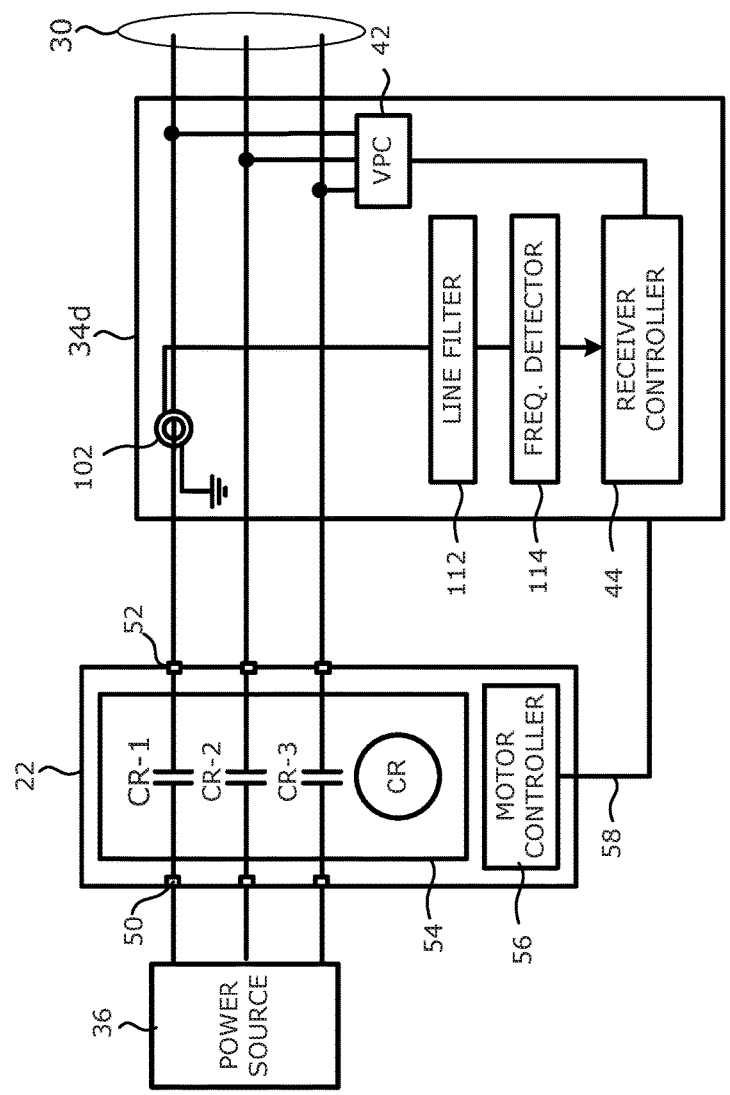
Figure 15:
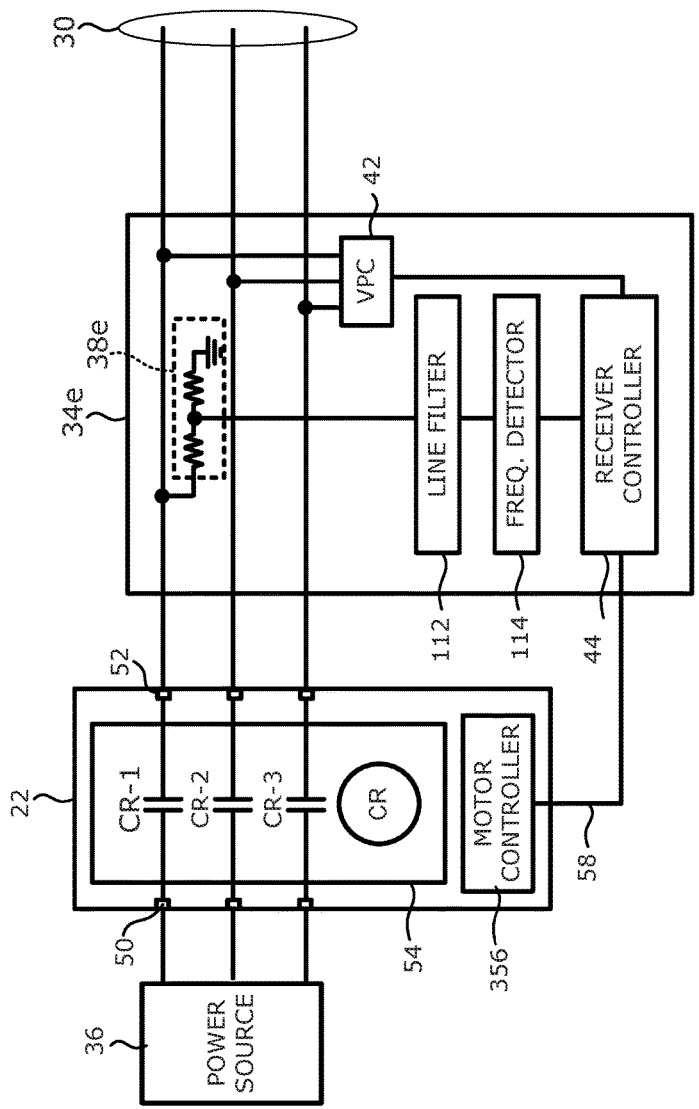

As described previously PLC receiver 34 includes a PMA parameter signals sensing circuit 38, a signals processing circuit 40, a voltage processing circuit 42, and a receiver controller 44. Referring to FIG. 12, in some embodiments PLC receiver 34 (shown as PLC receiver 34c) and motor control 22 are placed in an enclosure 340. Referring to FIG. 13, in some embodiments the components of PLC receiver 34, except for receiver controller 44, are placed with motor control 22 in enclosure 340. As described with reference to FIG. 3, the functions of receiver controller 44 and motor controller 56 are thus combined and motor controller 56 performs the functions of detecting messages and/or determining zero-crossings. Referring to FIG. 14, in some embodiments PLC receiver 34 (shown as PLC receiver 34d) senses PMA parameter signals in only one power line of multiple power lines, which does not require use of an analog switch, to simplify the implementation and reduce costs. This requires some additional effort during the initial configuration to ensure that the signals sensor is coupled to the correct phase. Referring to FIG. 15, in some embodiments PLC receiver 34 (shown as PLC receiver 34e) include a PMA parameter signals sensing circuit 38 (shown as PMA parameter signals sensing circuit 38e) that utilizes a voltage sensor instead of a current transformer. The voltage sensor may comprise a known voltage divider, as shown. Of course any of the previously described PMA parameter signals sensing circuit 38 may use voltage sensors instead of current transformers.

As used herein, the term "consecutive" when referring to voltage cycles or half-cycles means that the voltage cycles follow each other without an intermediate voltage cycle between them.

As used herein, the term "imposing" when referring to a voltage burst means that a burst of voltage pulses are generated on a power conductor at a frequency higher than and distinguishable from the line frequency. Imposing a voltage burst within a predetermined phase angle range of a zero-crossing means that the voltage burst is imposed at or near a zero-crossing, for example within a range of 30 electrical degrees of the zero-crossing, with the zero-crossing being within the range or at an endpoint of the range.

The scope of the invention is to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The embodiments and examples described above may be further modified within the spirit and scope of this disclosure. This application covers any variations, uses, or adaptations of the invention within the scope of the claims.

What is claimed is:

1. A method of transmitting information to monitor a submersible motor electrically connected to a first power conductor to receive power therefrom, the power having a voltage having a constant frequency, the method comprising:
    determining a parameter value;
    encoding the parameter value;
    detecting a zero-crossing of the voltage;
    imposing, on the first power conductor, voltage bursts having a first frequency and arranged to transmit a message including a header followed by a payload including the encoded parameter value, each voltage burst imposed adjacent a positive or a negative zero-crossing of the voltage, wherein the header is comprised in a first pattern of voltage bursts that is not repeated within the payload to thereby enable detection of the header by a power line communications receiver; and
    after imposing the voltage bursts having the first frequency to transmit the message, transmitting the message by imposing the voltage bursts at a second, higher, frequency.

2. The method of claim 1, wherein the first pattern consists of N voltage bursts imposed adjacent consecutive zero-crossings of the voltage.

3. The method of claim 2, wherein the payload is comprised in a second pattern of voltage bursts imposed adjacent zero-crossings, wherein in any N consecutive of the zero-crossings associated with the second pattern at most N-1 voltage bursts are imposed.

4. The method of claim 2, wherein the parameter value is a binary number, and wherein encoding the parameter value comprises inserting a 0 every N-1 bits of the binary number.

5. The method of claim 4, wherein in the second pattern a voltage burst represents a binary 0 or 1 and an absence of a voltage burst represents the other of a binary 0 or 1.

6. The method of claim 1, wherein the first frequency is 125 KHz and the second frequency is 333 KHz.

7. A submersible motor comprising:
a cylindrical housing;
motor terminals operable to connect the submersible motor to a power cable;
windings positioned in the housing and connected to the motor terminals, the motor terminals including a first motor terminal operable to connect a first winding of the windings to the first power conductor; and a power line communications (PLC) transmitter comprising:
   a transmitter controller configured to transmit information according to the method of claim 1;
   a power switch having a gate connected to the transmitter controller; and
   a power coupling component connected between the power switch and the first terminal, wherein the transmitter controller comprises logic operable to encode the parameter value, detect the zero-crossing of the voltage, and control the power switch based on the zero-crossing of the voltage to impose the voltage bursts via the power coupling component onto the first power conductor.

8. The submersible motor of claim 7, wherein the power coupling component comprises a capacitor in parallel with a resistor.

9. The submersible motor of claim 7, further comprising a power regulator to convert the voltage to a low voltage suitable to power the transmitter controller.

10. The submersible motor of claim 7, wherein the PLC transmitter has an arcuate shape with a curvature radius matching a curvature radius of the cylindrical housing and configured to fit within the cylindrical housing around the motor terminals.

11. A motor control adapted to supply power to a submersible motor over power conductors, the motor control comprising:
   a power switch operable to switch between a first state and a second state, wherein in the first state the motor control transmits power to the submersible motor, and wherein in the second state the motor drive does not transmit the power;
   a sensor adapted to detect electrical signals corresponding to voltage bursts imposed on one of the power conductors at a first frequency and at a second frequency higher than the first frequency, wherein the voltage bursts comprise a message including a header followed by a payload including an encoded parameter value, each voltage burst detectable adjacent a positive or a negative zero-crossing of a load voltage, and wherein the header is comprised in a first pattern of voltage bursts that is not repeated within the payload to thereby enable detection of the header;
   a frequency detector electrically connected to the sensor and configured to generate output pulses corresponding to the voltage bursts; and
   receiver logic electrically connected to the frequency detector, the receiver logic configured to detect in the output pulses the first pattern and, responsive to detecting the first pattern, to detect the parameter value.

12. The motor control of claim 11, further comprising a controller comprising the receiver logic and control logic operable to cause the power switch to switch between the first state and the second state.

13. The motor control of claim 11, wherein the sensor comprises a current transformer.

14. The motor control of claim 13, further comprising a line filter electrically connected to the current transformer and configured to filter a line frequency of the power transmitted over the power conductors.

15. The motor control of claim 11, further comprising a memory and an indicator configured to indicate an abnormal condition of the submersible motor based on a difference between the parameter value and a parameter limit stored in the memory.

16. A motor control system comprising:
   a submersible alternating current (AC) motor including a housing, motor windings positioned in the housing and having first and second winding leads adapted for connection to a power cable to receive power having a line frequency, a parameter sensor, and a power line communications (PLC) transmitter electrically connected to the first and second winding leads, the PLC transmitter configured to impose voltage bursts at a first frequency, the voltage bursts comprising a first pattern and a parameter value pattern based on a parameter value of a parameter sensed by the parameter sensor, wherein the first pattern is not repeated within the parameter value pattern, and wherein each of the voltage bursts are output within a predetermined time from a zero-crossing of a voltage on one of the first and second winding leads, and after imposing the voltage bursts at the first frequency, transmitting the first pattern and the parameter value pattern by imposing the voltage bursts at a second, higher, frequency;
   a first current transformer;
   a first line filter electrically connected to the first current transformer and configured to filter the line frequency from signals induced by the first current transformer;
   a first frequency detector electrically connected to the first line filter and configured to generate output pulses corresponding to the voltage bursts imposed at the first frequency; and
   a controller electrically connected to the frequency detector, the controller configured to detect in the output pulses the first pattern and, responsive to detecting the first pattern, to detect the parameter value.

17. The motor control system of claim 16, wherein the first pattern consists of N voltage bursts imposed adjacent consecutive zero-crossings of the voltage.

18. The motor control system of claim 16, further comprising a second current transformer, a second line filter electrically connected to the second current transformer and configured to filter the line frequency from signals induced by the second current transformer, a second frequency detector electrically connected to the second line filter and configured to generate output pulses corresponding to the voltage bursts imposed at the second frequency, and a signal switch, wherein the receiver logic is configured to actuate the signal switch to alternatively enable communication of the signals induced by the first current transformer or the second current transformers.

19. The motor control system of claim 16, wherein the PLC transmitter comprises:
   a power supply electrically connected to the first and second winding leads and having a direct current (DC) low voltage output contact;
   a voltage regulator electrically connected to the DC low voltage output contact;
   a transmitter controller connected to the voltage regulator and having a control output contact;
   a parameter sensor connected to the transmitter controller;
   a power switch having a gate electrically connected to the control output contact of the transmitter controller; and a power coupling component connected between the first winding lead and the power switch, wherein responsive to control bursts output by the transmitter controller on the control output contact within a predetermined time from a zero-crossing of a voltage on one of the first and second winding leads, the power coupling component generates the voltage bursts.

20. The motor control system of claim 16, further comprising a motor control including a power switch operable to switch between a first state and a second state, wherein in the first state the motor control transmits the power to the submersible AC motor, and wherein in the second state the motor drive does not transmit the power.

21. The motor control system of claim 16, further comprising a motor control including the controller and a power switch operable to switch between a first state and a second state, wherein in the first state the motor control transmits the power to the submersible AC motor, and wherein in the second state the motor control does not transmit the power, the controller being operable to cause the power switch to switch between the first state and the second state.

* * * * *